(12) United States Patent
Xu et al.

(10) Patent No.: US 11,999,280 B2
(45) Date of Patent: Jun. 4, 2024

(54) VEHICLE ORGANIZER

(71) Applicant: SHANGHAI MAODOUYA AUTOMOTIVE ELECTRONICS CO., LTD., Shanghai (CN)

(72) Inventors: Hechuan Xu, Shanghai (CN); Baichen Xu, Shanghai (CN)

(73) Assignee: SHANGHAI MAODOUYA AUTOMOTIVE ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 18/372,129

(22) Filed: Sep. 24, 2023

(65) Prior Publication Data

US 2024/0010114 A1    Jan. 11, 2024

Related U.S. Application Data

(63) Continuation of application No. 17/948,246, filed on Sep. 20, 2022, now Pat. No. 11,833,948.

(30) Foreign Application Priority Data

Sep. 22, 2021 (CN) .......................... 202122299121.9
Oct. 18, 2021 (CN) .......................... 202122509997.1

(51) Int. Cl.
  *A47B 31/06* (2006.01)
  *B60N 3/00* (2006.01)
(52) U.S. Cl.
  CPC .................................. *B60N 3/002* (2013.01)
(58) Field of Classification Search
  CPC ........ A47B 31/06; B60N 3/001; B60N 3/002; B60N 3/005; B60N 2002/905; B60R 7/046; B60R 7/06; B60R 2011/0005–0008; B60R 2011/0057; B60R 2011/0059; B60R 2011/0015; B60R 2011/0017; B60R 11/02
  USPC .............. 224/562, 483, 276; 108/44, 45, 47; 248/206.5, 218.4, 309.4
See application file for complete search history.

(56) References Cited

U.S. PATENT DOCUMENTS

| | | | | |
|---|---|---|---|---|
| 1,440,061 | A * | 12/1922 | Connolly | B60R 7/08 40/643 |
| 5,222,690 | A * | 6/1993 | Jeffords | B64D 43/00 224/276 |
| 5,419,478 | A * | 5/1995 | Mauro | B60N 3/103 224/558 |
| 6,227,425 | B1 * | 5/2001 | Ware, Sr. | A63B 55/61 224/276 |
| 7,066,363 | B2 * | 6/2006 | Lecoq | B60N 3/10 224/558 |
| 7,686,337 | B2 * | 3/2010 | Myers | B62D 1/16 280/779 |
| 9,022,459 | B2 * | 5/2015 | Le Jaouen | B62D 1/16 296/72 |
| 11,673,598 | B2 * | 6/2023 | Nakajima | B62D 1/04 280/779 |
| 2016/0325662 | A1 * | 11/2016 | Nash | B62D 1/04 |

* cited by examiner

*Primary Examiner* — Adam J Waggenspack

(57) ABSTRACT

The present disclosure provides a vehicle organizer. The vehicle organizer includes a receiving assembly and a fixing assembly. The fixing assembly is detachably connected with the receiving assembly to form a connected structure. In a mounting state, the connecting beam passes through the connected structure, the connected structure is abutted against the connecting beam, such that the receiving assembly is detachably mounted in the vehicle.

8 Claims, 23 Drawing Sheets

VEHICLE ORGANIZER

CROSS-REFERENCES TO RELATED APPLICATIONS

The present application is a continuation of U.S. application Ser. No. 17/948,246, filed Sep. 20, 2022. The disclosure of which is hereby incorporated by reference in its entirety.

FIELD

The present disclosure relates to the technical field of vehicles, specifically to a shelf, and a vehicle applying the shelf.

BACKGROUND

With the development of the times, car has become a necessity for people. The storage space in the car is small, so it is necessary to arrange a shelf in the car.

SUMMARY

The present disclosure provides a shelf which can provide a storage space for store objects.

The shelf can be mounted in a vehicle, the vehicle includes a mounting portion, the shelf includes a receiving assembly defining a storage space for store objects, the receiving assembly is mounted on the mounting portion.

In at least one embodiment, the mounting portion includes a front panel, the receiving assembly is mounted on the front panel by at least one connecting member; or the mounting portion includes a front panel and a display panel opposite to the front panel, the receiving assembly is mounted on the front panel and clamped between the front panel and the display panel; or the mounting portion includes a front panel and a connecting beam connected with the front panel, the receiving assembly includes a first clamping member defining a clamping space, the receiving assembly is mounted on the front panel, and the connecting beam is clamped in the clamping space; or the mounting portion includes a front panel, a display panel, and a connecting beam connected between the front panel and the display panel, the receiving assembly includes a first clamping member defining a clamping space, the receiving assembly is mounted on the front panel and clamped between the front panel and the display panel, and the connecting beam is clamped in the clamping space.

In at least one embodiment, the shelf further includes a first magnetic member for magnetically adsorbing a magnetic element, a wall of the storage space defines a third receiving groove, the first magnetic member is received in the third receiving groove; and/or the receiving assembly further includes a first bottom wall and at least one side wing connected with the first bottom wall, the mounting portion includes a front panel, the first bottom wall is mounted on the front panel, and the side wing includes a curved surface, the curved surface is matched with the front panel in shape, the curved surface is abutted against the front panel when the receiving assembly is mounted on the front panel.

In at least one embodiment, the shelf further includes a fixing assembly detachably connected with the receiving assembly, the fixing assembly and the receiving assembly cooperatively define a mounting space, the mounting portion includes a connecting beam, the connecting beam is received in the mounting space, so as to mount the shelf on the connecting beam.

In at least one embodiment, the receiving assembly includes two first connecting members; and the fixing assembly includes two second connecting members, the first connecting members are detachably connected with the second connecting members to detachably connect the receiving assembly with the fixing assembly.

In at least one embodiment, each of the first connecting members defines a first receiving groove; each of the second connecting members defines a second receiving groove; and the shelf further includes two second magnetic members respectively received in the first receiving grooves, and two third magnetic members respectively received in the second receiving grooves, the first connecting member is detachably connected with the second connecting member by a magnetic force between the second magnetic member and the third magnetic member, the magnetic force between the second magnetic member and the third magnetic member has a range of 300~600 mT.

In at least one embodiment, one of the first connecting member and the second connecting member is protruded with a second clamping member, another one of the first connecting member and the second connecting member defines a clamping groove, the second clamping member is detachably clamped in the clamping groove; or one of the first connecting member and the second connecting member is protruded with a screw rod, another one of the first connecting member and the second connecting member defines a screw hole, the screw rod is detachably received in the screw hole; or the first connecting member defines a first positioning hole, the second connecting member defines a second positioning hole, the first positioning hole is communicated with the second connecting hole when the first connecting member is connected with the second connecting member.

In at least one embodiment, the receiving member includes a first bottom wall connected with the first connecting members, and at least one first side wall connected with the first bottom wall, the first bottom wall and the first side wall cooperatively define the storage space, the first bottom wall, the first connecting members, and the fixing assembly cooperatively define the mounting space.

In at least one embodiment, the mounting portion further includes a front panel, the connecting beam is arranged on the front panel, the receiving member further includes at least one side wing connected with the first bottom wall, the side wing includes a curved surface, the curved surface is matched with the front panel in shape, the curved surface is abutted against the front panel when the connecting beam is received in the mounting space.

In at least one embodiment, a quantity of the at least one first side wall is more than one, an angle between one of the at least one first side wall and the first bottom wall is greater than 90°; and/or one first side wall of the at least one first side wall is arc-shaped.

In at least one embodiment, the fixing assembly further includes: a retaining member configured to retain against the connecting beam when the connecting beam is received in the mounting space.

In at least one embodiment, the fixing member further include a first storage box connected with the second connecting members, the first storage box, the second connecting members, and the receiving assembly cooperatively define the mounting space, the first storage box defines at least one opening for placing objects in the first storage box or taking objects out of the first storage box.

In at least one embodiment, the first storage box includes a second side wall and a third side wall connected with the second side wall, the second connecting members are connected with the second side wall and/or the third side wall, the second side wall defines a first opening for placing objects in the first storage box or taking objects out of the first storage box, the third side wall defines a second opening for placing objects in the first storage box.

In at least one embodiment, the first storage box further includes a second bottom wall connected with the second side wall and the third side wall, the second bottom wall defines a third opening, the first opening is narrow and long, the first opening is configured to facilitate taking paper towels.

In at least one embodiment, the first storage box further includes a fourth side wall connected between the third side wall and the second bottom wall.

In at least one embodiment, the fourth side wall defines a fourth opening communicated with the second opening; and/or the first storage box further includes at least one fifth side wall, the fifth side wall is connected between the third side wall, the second bottom wall, and the fourth side wall; and/or the second bottom wall is protruded with at least one reinforcing rib; and/or the second bottom wall defines at lease one receiving groove, the first storage box further includes at least one fourth magnetic member received in the receiving groove, the fourth magnetic member is configured for magnetically adsorbing an electronic device.

In at least one embodiment, the first storage box further includes a receiving cavity and a drawer received in the receiving cavity in a drawable manner by the first opening.

In at least one embodiment, the shelf further includes a second storage box communicated with the first storage box, one side of the second storage box is rotatably connected with the first storage box, and another side of the second storage box is detachably connected with the first storage box.

In at least one embodiment, the shelf further includes a second storage box communicated with the first storage box and having a third bottom wall, the third bottom wall defines a fifth opening, the second storage box includes a supporting element arranged on the third bottom wall, the supporting element is configured to support objects in the second storage box and divide the fifth opening into two sub-openings, the sub-openings is configured to facilitate taking wet tissues.

In at least one embodiment, the mounting portion includes a front panel and a connecting beam connected with the front panel, the receiving assembly further includes: a first bottom wall, and two side wings arranged on the first bottom wall and matched with the front panel in shape, the side wing includes a curved surface, the curved surface is matched with the front panel in shape, when the receiving assembly is mounted on the mounting portion, the first bottom wall is mounted on the front panel, the curved surface is abutted against the front panel, and the connecting beam is clamped between free ends of the side wings; or the receiving assembly further includes: a first bottom wall, and a receiving portion arranged on the first bottom wall and matched with the connecting beam in shape, when the receiving assembly is mounted on the mounting portion, the first bottom wall is mounted on the front panel, the receiving assembly is mounted on the connecting beam by a connecting member; or the receiving assembly further includes a first bottom wall, two side wings arranged on the first bottom wall and matched with the front panel in shape, and a receiving portion arranged on the first bottom wall and matched with the connecting beam in shape, the side wing includes a curved surface, the curved surface is matched with the front panel in shape, the side wings and the receiving portion cooperatively from a mounting space, when the receiving assembly is mounted on the mounting portion, the first bottom wall is mounted on the front panel, the curved surface is abutted against the front panel, the receiving assembly is mounted on the connecting beam by a connecting member, and the connecting beam is mounted in the mounting space.

The present disclosure further provides a vehicle, which includes a mounting portion and the shelf as described above.

In the technical solution of the present disclosure, the shelf includes a receiving assembly having a storage space for store objects and a fixing assembly. The fixing assembly is detachably connected with the receiving assembly, the fixing assembly and the receiving assembly cooperatively define a mounting space, the mounting portion is received in the mounting space, so as to mount the shelf on the mounting portion. The shelf of the present disclosure can be mounted on the mounting portion of the vehicle, to improve a storage space of the vehicle.

BRIEF DESCRIPTION OF THE DRAWINGS

Implementations of the present disclosure will now be described, by way of embodiment, with reference to the attached FIG.s. It should be understood, the drawings are shown for illustrative purpose only, for ordinary person skilled in the art, other drawings obtained from these drawings without paying creative labor by an ordinary person skilled in the art should be within scope of the present disclosure.

Figure 1:
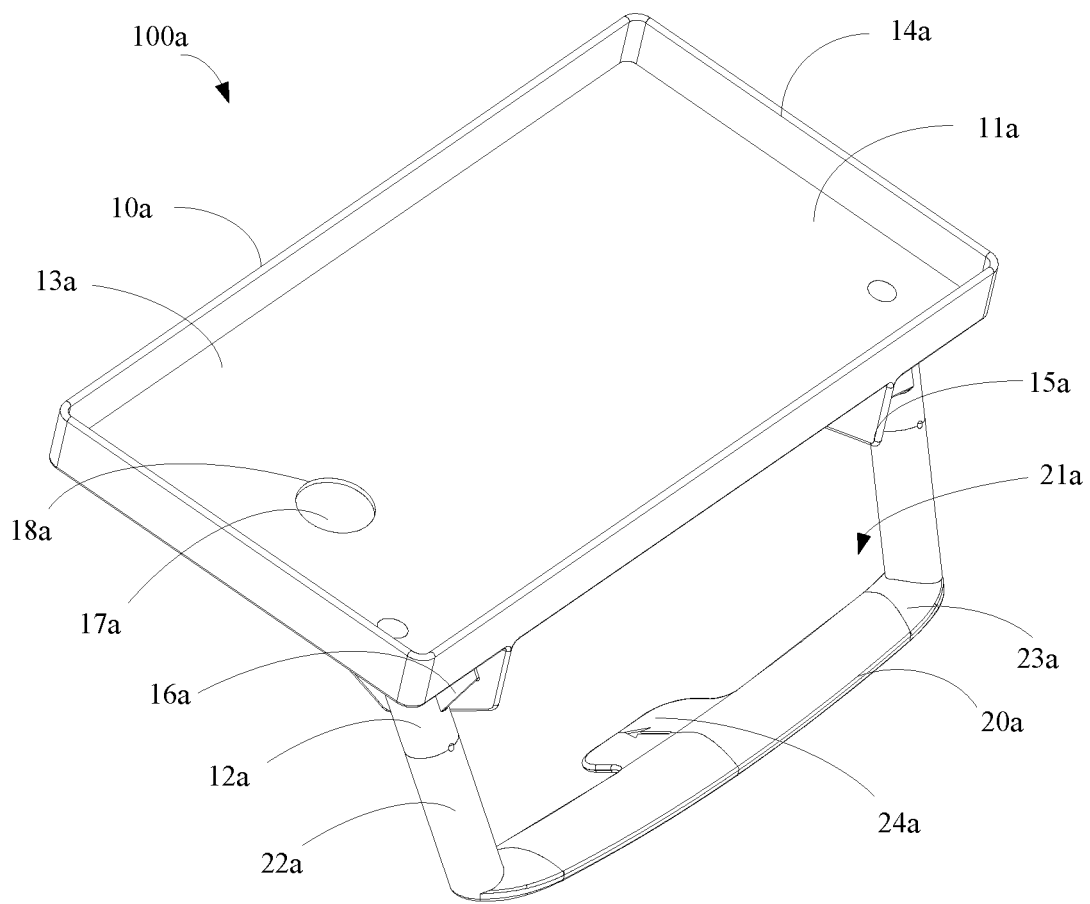
FIG. 1 is a structure diagram of a shelf according to a first embodiment of the present disclosure.

The realization of the aim, functional characteristics, advantages of the present disclosure are further described specifically with reference to the accompanying drawings and embodiments.

DETAILED DESCRIPTION

It will be appreciated that for simplicity and clarity of illustration, where appropriate, reference numerals have been repeated among the different FIG.s to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion in the so-described combination, group, series, and the like. the present disclosure is illustrated by way of example and not by way of limitation in the FIG.s of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the said features. In the description of embodiments of the application, "a plurality of" means two or more, unless otherwise specifically defined.

Figure 2:
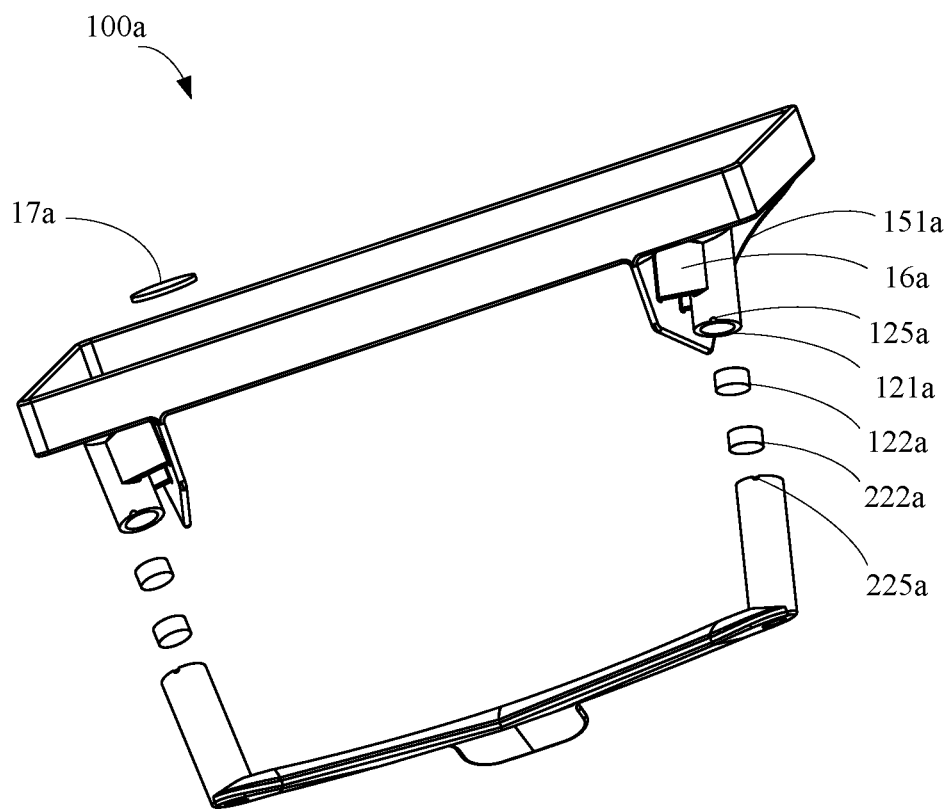
FIG. 2 is an exploded view of the shelf of FIG. 1.
Figure 3:
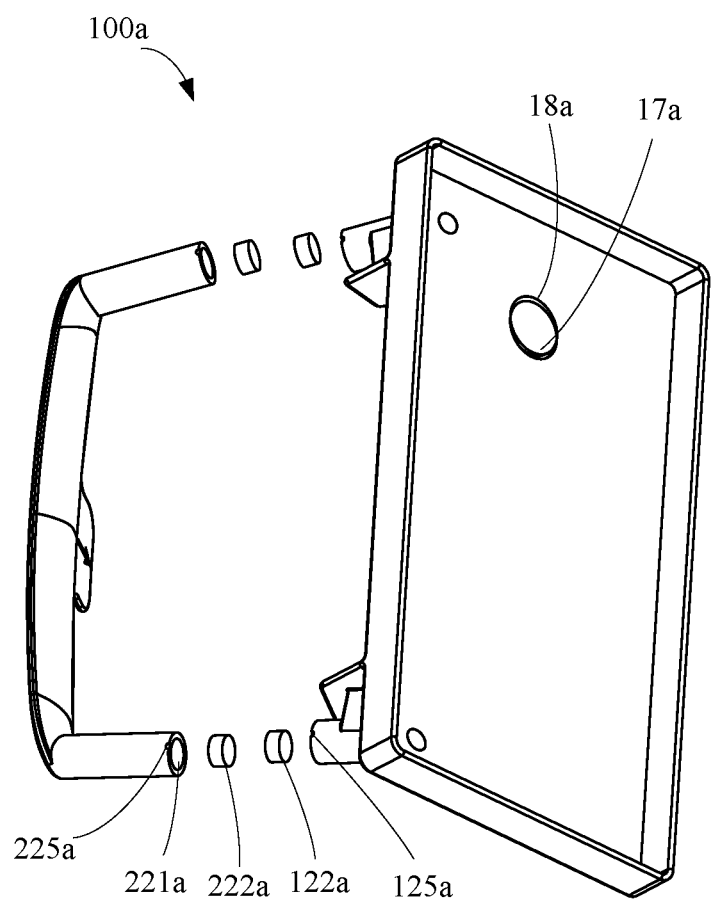
FIG. 3 is similar to FIG. 2, but shown from another view.

Please referring to FIGS. 1 to 3, the present disclosure provides a shelf 100a (also named as vehicle organizer) according to a first embodiment. The shelf 100a can be mounted on a mounting portion 201 of a vehicle 200.

The shelf 100a includes a receiving assembly 10a and a fixing assembly 20a detachably connected with the receiving assembly 10a. The receiving assembly 10a defines a storage space 11a for store objects. The fixing assembly 20a and the receiving assembly 10a cooperatively define a mounting space 21a, the mounting portion 201 includes a connecting beam 2013, the connecting beam 2013 is received in the mounting space 21a, so as to mount the shelf 100a on the mounting portion 201.

In at least one embodiment, the receiving assembly 10a can be made of plastic, silicone, rubber, metal, wood, or the like.

In at least one embodiment, the receiving member 10a includes a first bottom wall 13a, and at least one first side wall 14a connected with the first bottom wall 13a, and two first connecting members 12a connected with the first bottom wall 13a. The first bottom wall 13a and the first side wall 14a cooperatively define the storage space 11a, the first bottom wall 13a, the first connecting members 12a, and the fixing assembly 20a cooperatively define the mounting space 21a.

In at least one embodiment, the shelf 100a further includes a first magnetic member 17a for magnetically adsorbing a magnetic element, the first bottom wall 13a defines a receiving groove 18a, the first magnetic member 17a is received in the receiving groove 18a. The magnetic element can be an ETC (Electronic Toll Collection) sensor which can magnetically absorb with the first magnetic member 17a, and an ETC card for increasing a vehicle passing rate is inserted in the ETC sensor.

In at least one embodiment, the fixing assembly 20a includes two second connecting members 22a, the first connecting members 12a are detachably connected with the second connecting members 22a to detachably connect the receiving assembly 10a with the fixing assembly 20a.

In at least one embodiment, each of the first connecting members 12a defines a first receiving groove 121a, each of the second connecting members 22a defines a second receiving groove 221a, the shelf 100a further includes two second magnetic members 122a and two third magnetic members 222a, the two second magnetic members 122a are respectively received in the first receiving grooves 121a, and the two third magnetic members 222a are respectively received in the second receiving grooves 221a, so the first connecting members 12a are detachably connected with the second connecting members 22a by forces between the second magnetic members 122a and the third magnetic members 222a. The magnetic force between the second magnetic member 122 and the third magnetic member 222 has a range of 300~600 milli Tesla, preferably 300~500 mT, much more preferably 350~400 mT.

In at least one embodiment, the first connecting member 12a defines a first positioning hole 125a, the second connecting member 22a defines a second positioning hole 225a, when the first connecting member 12a is connected with the second connecting member 22a, the first positioning hole 125a is communicated with the second connecting hole 225a.

In at least one embodiment, the first positioning hole 125a is semi circular shaped, the second connecting hole 225a is semi circular shaped, the first positioning hole 125a and the second connecting hole 225a cooperatively from a circular hole when the first connecting member 12a is connected with the second connecting member 22a.

In at least one embodiment, the mounting portion 201 further includes a front panel 2011 connected with the connecting beam 2013. The shelf 100a further includes at least one side wing 15a connected with the first bottom wall 13a, the side wing 15a includes a curved surface 151a, the curved surface 151a is matched with the front panel 2011 in shape, when the connecting beam 2013 is received in the mounting space 21a, the curved surface 151a is abutted against the front panel 2011, so the receiving assembly 10a can be mounted on the front panel 2011 stably. The first bottom wall 13a can also be connected with the front panel 2011 by a connecting element, such as a double sides adhesive tape.

It should be understood that, the curved surface 151a can increase a contact area between the side wing 15a and the front panel 2011, so the receiving assembly 10a can be mounted on the front panel 2011 stably.

It should be understood that, as the receiving assembly 10a is mounted on the front panel, the movements of the objects in the storage space 11a would not affect the driver. Further, the connecting beam 2013 is close to driver, driver can easily install the shelf 100a on the connecting beam 2013, or easily separate the shelf 100a from the connecting beam 2013. The shelf 100a can also be mounted elsewhere in the vehicle 200.

In at least one embodiment, the mounting portion 201 further includes a display panel 2012 connected with the connecting beam 2013, the display panel 2012 is opposite to the front panel 2011, the receiving assembly 10a can be clamped between the display panel 2012 and the front panel 2011 when the connecting beam 2013 is received in the mounting space 21a. In detail, the front panel 2011 is protruded with a blocking member 2014, the receiving assembly 10a can be clamped between the display panel 2012 and the blocking member 2014.

In at least one embodiment, a quantity of the at least one side wing 15a is two, the two side wings 15a are arranged on two opposite sides of the first bottom wall 13a.

In at least one embodiment, the shelf 100a further includes at least one reinforcing member 16a, the reinforcing member 16a is connected between the side wing and the first connecting member 12a.

In at least one embodiment, a quantity of the at least one reinforcing member 16a is two, each reinforcing member 16a is arranged between one corresponding side wing 15a and one corresponding first connecting member 12a.

In at least one embodiment, the fixing assembly 20a further includes a third connecting member 23a connected with the second connecting members 22a, the first bottom wall 13a, the first connecting members 12a, and the second connecting member 22a, and the third connecting member 23a cooperatively define the mounting space 21a.

In at least one embodiment, the third connecting member 23a is protruded with a retaining member 24a, the retaining member 24a is retained against the connecting beam 2013 when the shelf 100a is mounted on the mounting portion 201, and the shelf 100a can be mounted on the front panel 2011 stably.

In the technical solution of the present disclosure, the shelf 100a includes the receiving assembly 10a having the storage space 11a for store objects and the fixing assembly 20a. The fixing assembly 20a is detachably connected with the receiving assembly 10a, the fixing assembly 20a and the receiving assembly 10a cooperatively define the mounting space 21a, the connecting beam 2013 is received in the mounting space 21a, so as to mount the shelf 100a on the mounting portion 201. The shelf 100a of the present disclosure can be mounted on the mounting portion 201 of the vehicle 200, to improve a storage space of the vehicle 200.

Figure 4:
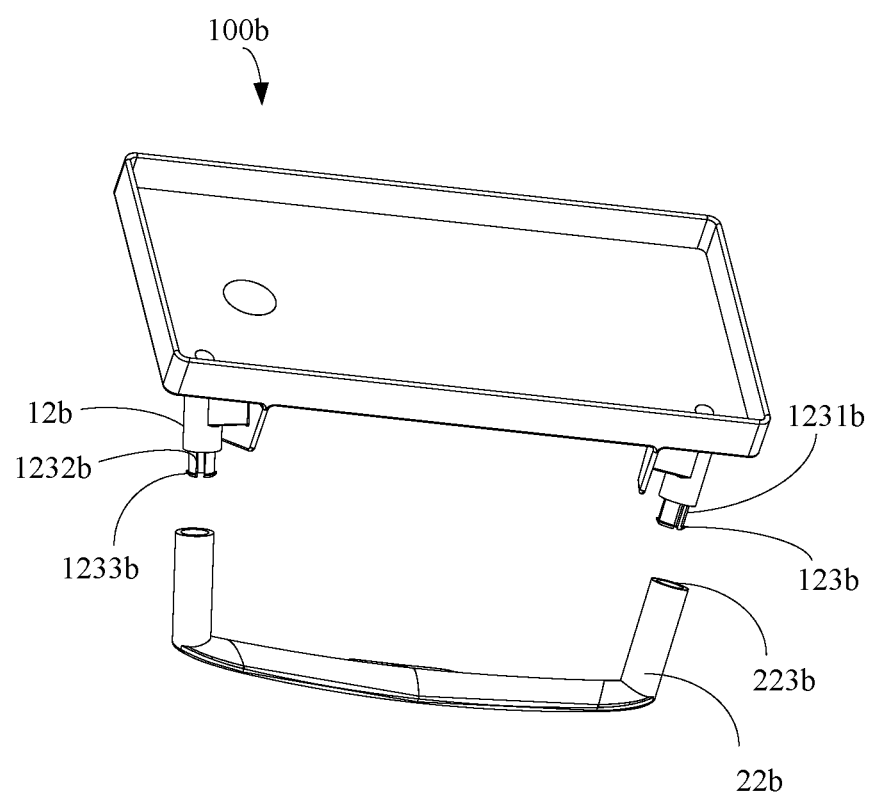
FIG. 4 is a structure diagram of a shelf according to a second embodiment of the present disclosure.

Please referring to FIG. 4, the present disclosure provides a shelf 100b according to a second embodiment. The shelf 100b is similar to the shelf 100a in structure, the differences between the shelf 100b and the shelf 100a include: one of the first connecting member 12b and the second connecting member 22b is protruded with a clamping member 123b, another one of the first connecting member 12b and the second connecting member 22b defines a clamping groove 223b, the clamping member 123b is detachably clamped in the clamping groove 223b.

In at least one embodiment, the clamping member 123b includes a plurality of clamping portions 1231b spaced apart from each other, each two adjacent clamping portions 1231b defines a gap 1232b, and a free end of the clamping portion 1231b is protruded with a protrusion 1233b. When the clamping member 123b is clamped in the clamping groove 223b, the protrusion 1233b is abutted against an inner wall of the clamping groove 223b.

Figure 5:
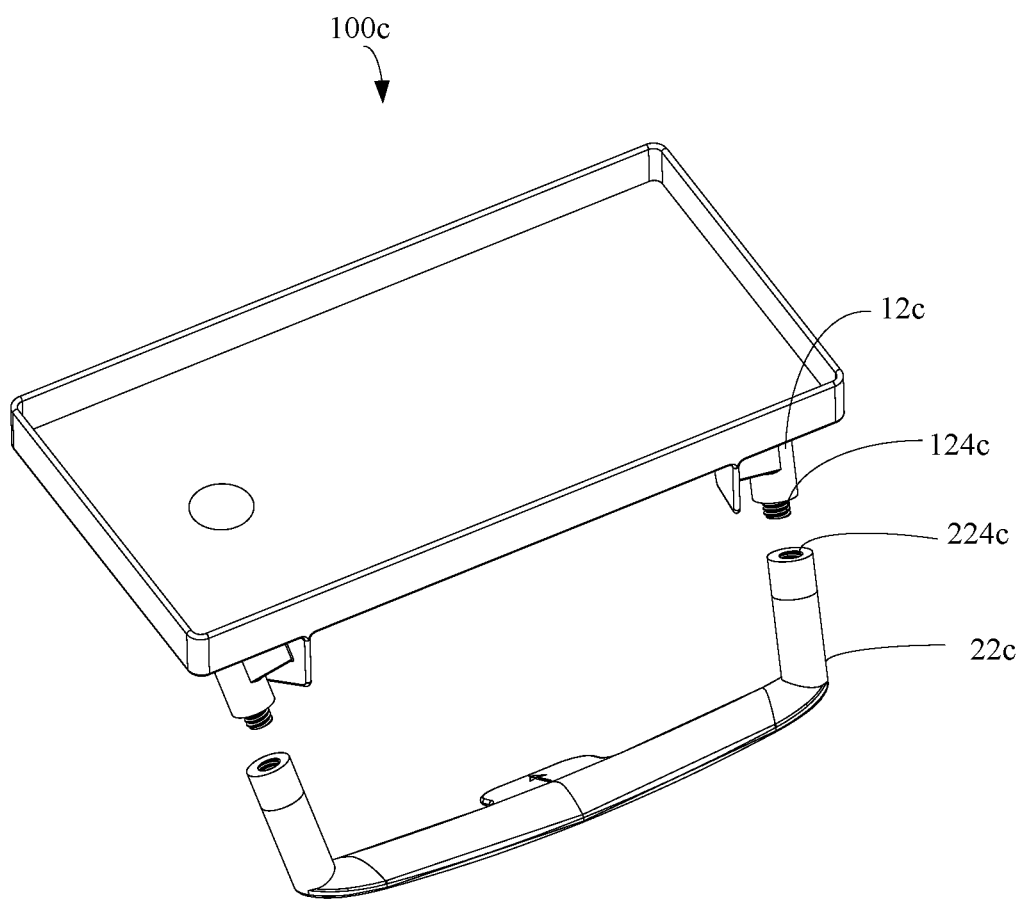
FIG. 5 is a structure diagram of a shelf according to a third embodiment of the present disclosure.

Please referring to FIG. 5, the present disclosure provides a shelf 100c according to a third embodiment. The shelf 100c is similar to the shelf 100a in structure, the differences between the shelf 100c and the shelf 100a include: one of the first connecting member 12c and the second connecting member 22c is protruded with a screw rod 124c, another one of the first connecting member 12c and the second connecting member 22c defines a screw hole 224c, the screw rod 124c is detachably received in the screw hole 224c.

Figure 6:
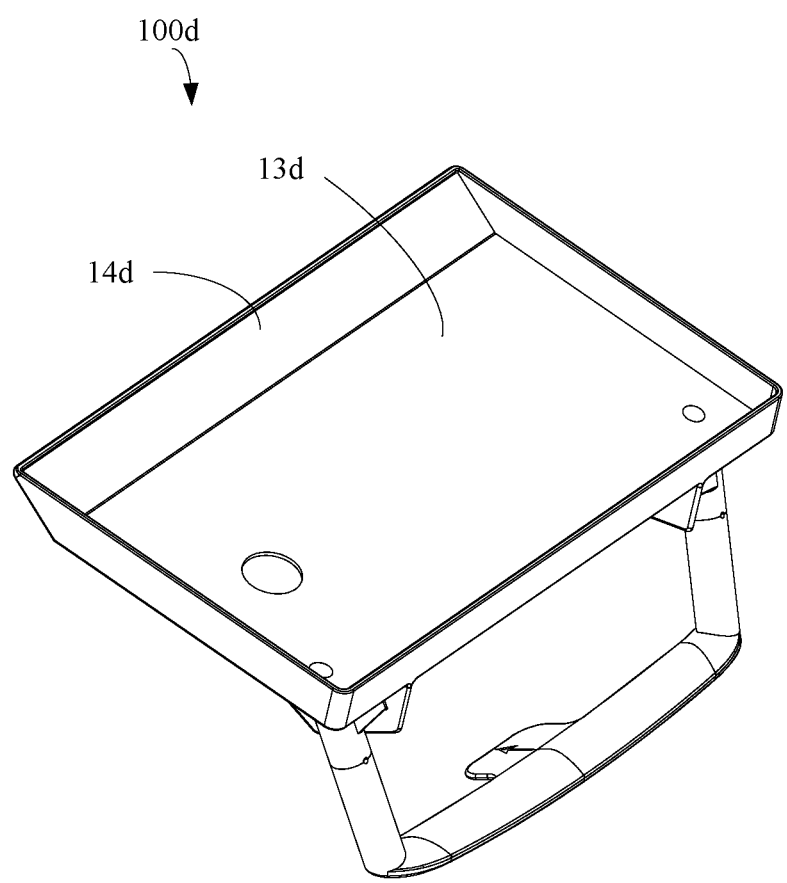
FIG. 6 is a structure diagram of a shelf according to a fourth embodiment of the present disclosure.

Please referring to FIG. 6, the present disclosure provides a shelf 100d according to a fourth embodiment. The shelf 100d is similar to the shelf 100a in structure, the differences between the shelf 100d and the shelf 100a include: a quantity of the at least one first side wall 14d is more than one, and an angle between the first side wall 14d and the first bottom wall 13d is greater than 90°, to increase a volume of the storage space.

In at least one embodiment, one first side wall 14d is inclined away from the front panel 2011.

Figure 7:
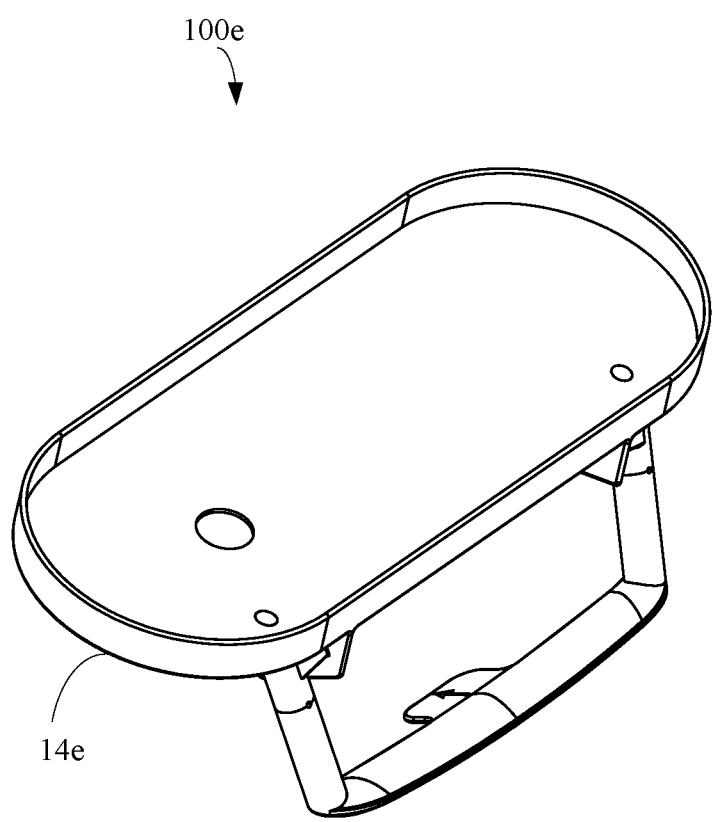
FIG. 7 is a structure diagram of a shelf according to a fifth embodiment of the present disclosure.

Please referring to FIG. 7, the present disclosure provides a shelf 100e according to a fifth embodiment. The shelf 100e is similar to the shelf 100a in structure, the differences between the shelf 100e and the shelf 100a include: a quantity of the at least one first side wall 14e is more than one, and at least one first side wall 14e is arc-shaped, to ensure safety.

In at least one embodiment, two opposite first side walls 14e are arc-shaped, and the side walls 14e are racetrack-shaped.

Figure 8:
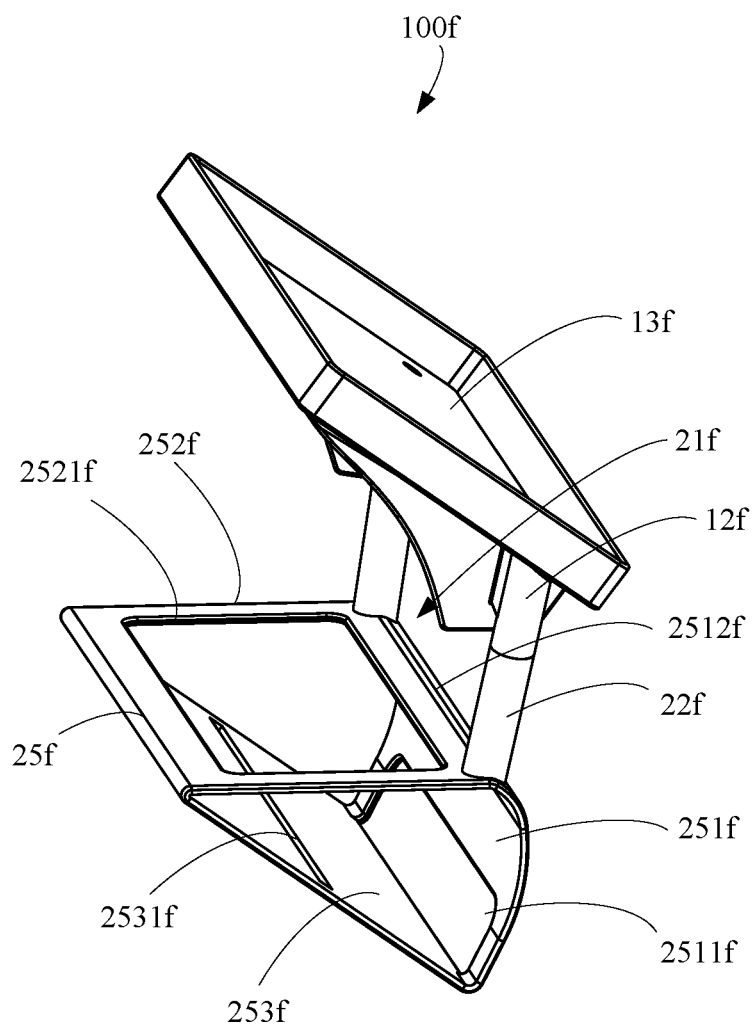
FIG. 8 is a structure diagram of a shelf according to a sixth embodiment of the present disclosure.

Please referring to FIG. 8, the present disclosure provides a shelf 100f according to a sixth embodiment. The shelf 100f is similar to the shelf 100a in structure, the differences between the shelf 100f and the shelf 100a include: the fixing member 20f further includes a first storage box 25f connected with the second connecting members 22f, the first storage box 25f, the second connecting members 22f, the first connecting members 12f, and the first bottom wall 13f cooperatively define the mounting space 21f, the first storage box 25f defines at least one opening for placing objects in the first storage box 25f or taking objects out of the first storage box 25f.

In at least one embodiment, the first storage box 25f includes a second side wall 251f and a third side wall 252f connected with the second side wall 251f. The second connecting members 22f is connected at an angle with the second side wall 251f, the third side wall 252f, or a connecting portion 2512f of the second side wall 251f and the third side wall 252f.

In at least one embodiment, the second side wall 251f defines a first opening 2511f, user can place objects, such as mobile phones, earphones, into the first storage box 25f by the first opening 2511f.

In at least one embodiment, the second side wall 251f is arc-shaped.

In at least one embodiment, the third side wall 252*f* defines a second opening 2521*f*, user can place objects, such as mobile phones, earphones, into the first storage box 25*f* by the second opening 2521*f*.

In at least one embodiment, when the shelf 100*f* is mounted on the mounting portion 201, the second opening 2521*f* is covered by the front panel 2011, so the second opening 2521*f* can be arranged to be larger than the first opening 2511*f*.

In at least one embodiment, the first storage box 25*f* further includes a second bottom wall 253*f* connected with the second side wall 251*f* and the third side wall 252, the second bottom wall 253*f* defines a third opening 2531*f*, the first opening 2531*f* is narrow and long, the first opening 2531*f* is configured to facilitate taking paper towels.

Figure 9:
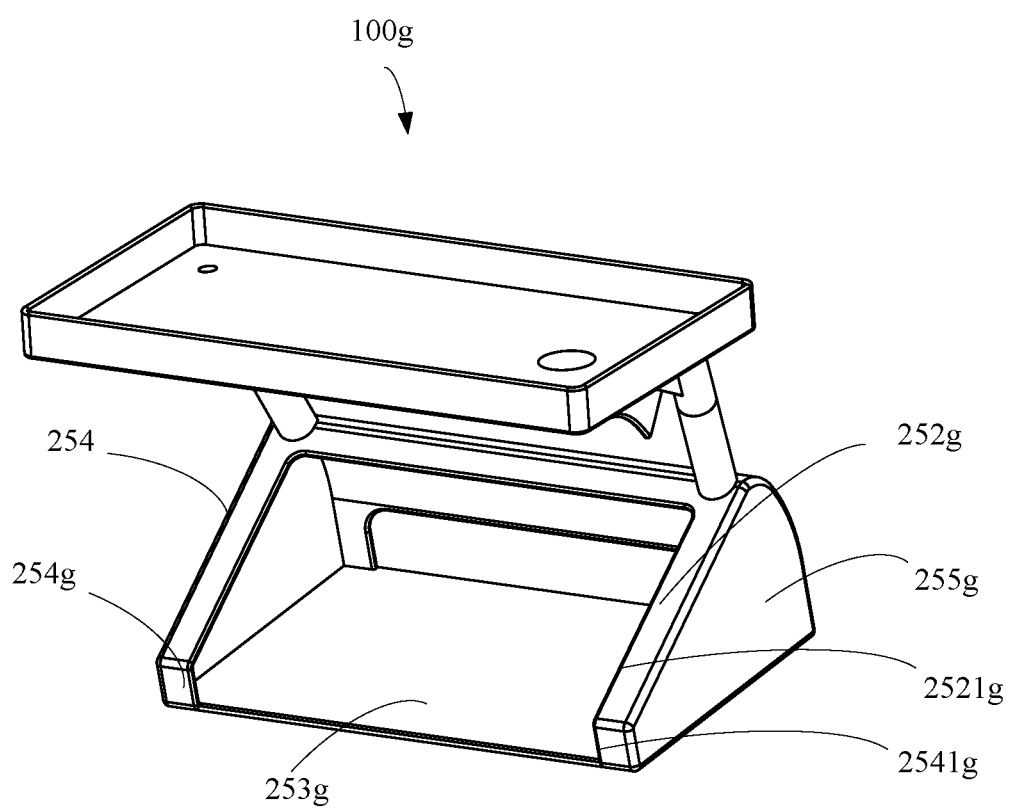
FIG. 9 is a structure diagram of a shelf according to a seventh embodiment of the present disclosure.

Please referring to FIG. 9, the present disclosure provides a shelf 100*g* according to a seventh embodiment. The shelf 100*g* is similar to the shelf 100*f* in structure, the differences between the shelf 100*g* and the shelf 100*f* include: the first storage box 25*g* further includes at least one fourth side wall 254*g* connected between the third side wall 252*g* and the second bottom wall 253*g*, the fourth side wall 254*g* defines a fourth opening 2541*g* communicated with the second opening 2521*g*; the first storage box 25*g* further includes at least one fifth side wall 255*g*, the fifth side wall 255*g* is connected between the third side wall 252*g*, the second bottom wall 253*g*, and the fourth side wall 254*g*.

In at least one embodiment, the first storage box 25*g* further includes two fifth side walls 255*g* arranged on two opposite ends of the first storage box 25*g*.

Figure 10:
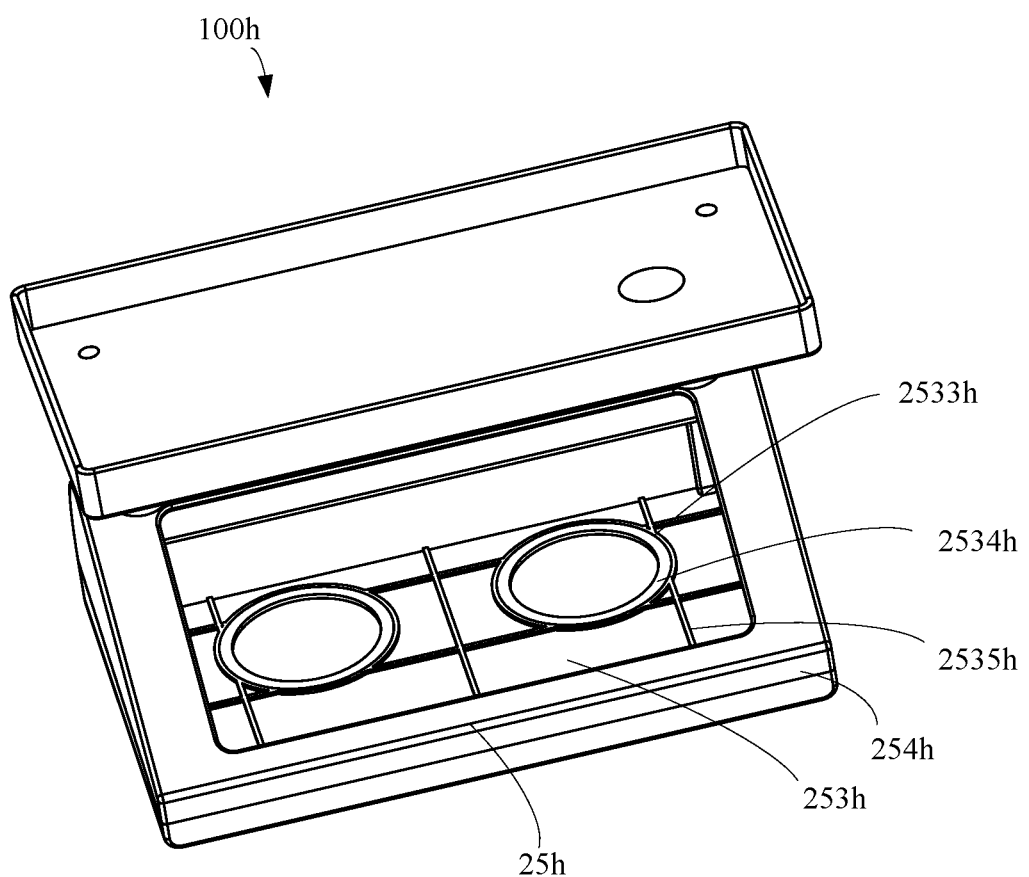
FIG. 10 is a structure diagram of a shelf according to an eighth embodiment of the present disclosure.

Please referring to FIG. 10, the present disclosure provides a shelf 100*h* according to an eighth embodiment. The shelf 100*h* is similar to the shelf 100*g* in structure, the differences between the shelf 100*h* and the shelf 100*g* include: the second bottom wall 253*h* defines at lease one receiving groove 2533*h*, the first storage box 25*h* further includes at least one fourth magnetic member 2534*h* received in the receiving groove 2533*h*, the fourth magnetic member 2534*h* is configured for magnetically adsorbing an electronic device, such as a mobile phone.

In at least one embodiment, the fourth side wall 254*h* does not define the fourth opening.

In at least one embodiment, the second bottom wall 253*h* is protruded with at least one reinforcing rib 2535*h*.

Figure 11:
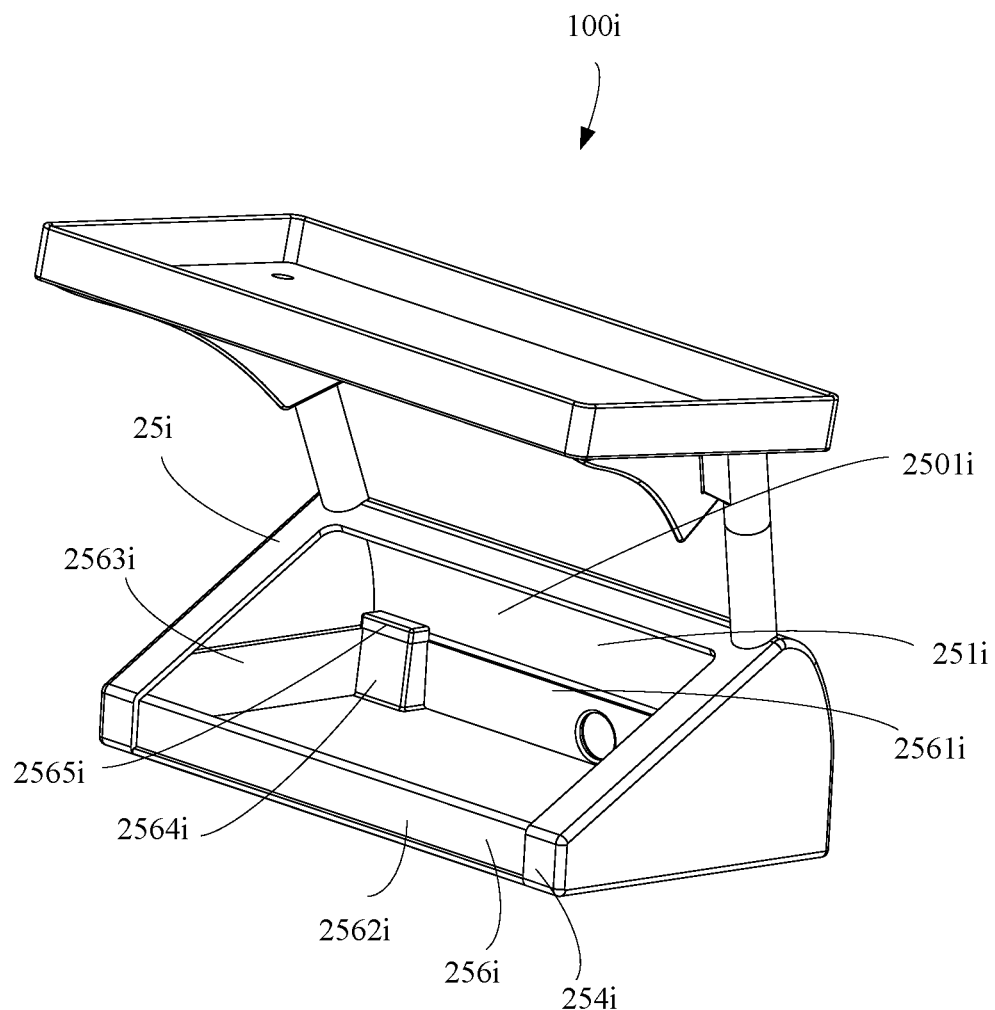
FIG. 11 is a structure diagram of a shelf according to a ninth embodiment of the present disclosure.
Figure 12:
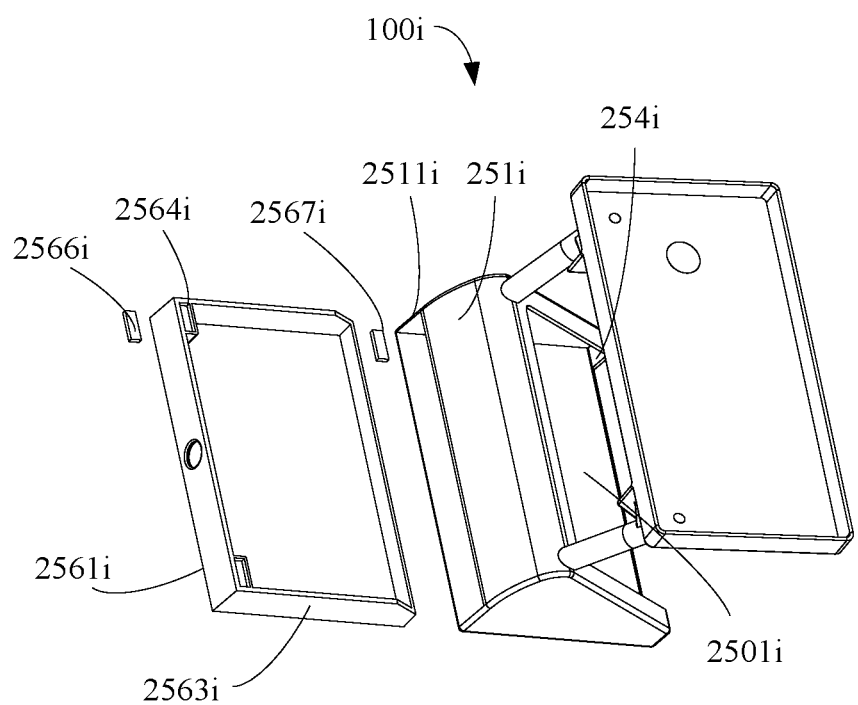
FIG. 12 is an exploded view of the shelf of FIG. 11.

Please referring to FIGS. 11 and 12, the present disclosure provides a shelf 100*i* according to a ninth embodiment. The shelf 100*i* is similar to the shelf 100*g* in structure, the differences between the shelf 100*i* and the shelf 100*g* include: the first storage box 25*i* further includes a drawer 256*i* and a receiving cavity 2501*i*, the drawer 256*i* is received in the receiving cavity 2501*i* in a drawable manner by the first opening 2511*i*.

In at least one embodiment, the first opening 2511*i* extends through two opposite end walls of the second side wall 251*i*.

In at least one embodiment, the drawer 256*i* is stopped by the fourth side wall 254*i*.

In at least one embodiment, the drawer 256*i* includes a front wall 2561*i*, a back wall 2562*i* opposite to the front wall 2561*i*, two opposite sixth side walls 2563*i* respectively connected with the front wall 2561*i* and the back wall 2562*i*.

In at least one embodiment, the front wall 2561*i* defines a hole (not labeled) which can be used as a handle.

In at least one embodiment, the drawer 256*i* includes at least one first receiving portion 2564*i* arranged on the front wall 2561*i* and/or the sixth side wall 2563*i*, and at least one second receiving portion 2565*i* arranged on the second side wall 251*i*. The drawer 256*i* further includes at least one fourth magnetic member 2566*i* received in the first receiving portion 2564*i*, and at least one fifth magnetic member 2567*i* received in the second receiving portion 2565*i*. When the drawer 256*i* is received in the receiving cavity 2501*i*, the fourth magnetic member 2566*i* is absorbed with the fifth magnetic member 2567*i*, to prevent the drawer 256*i* from moving out of the receiving cavity 2501*i* automatically.

In at least one embodiment, the first receiving portion 2564*i* may define a groove (not labeled) for receiving fourth magnetic member 2566*i*.

In at least one embodiment, the second receiving portion 2565*i* may define a groove (not shown) for receiving fifth magnetic member 2567*i*.

Figure 13:
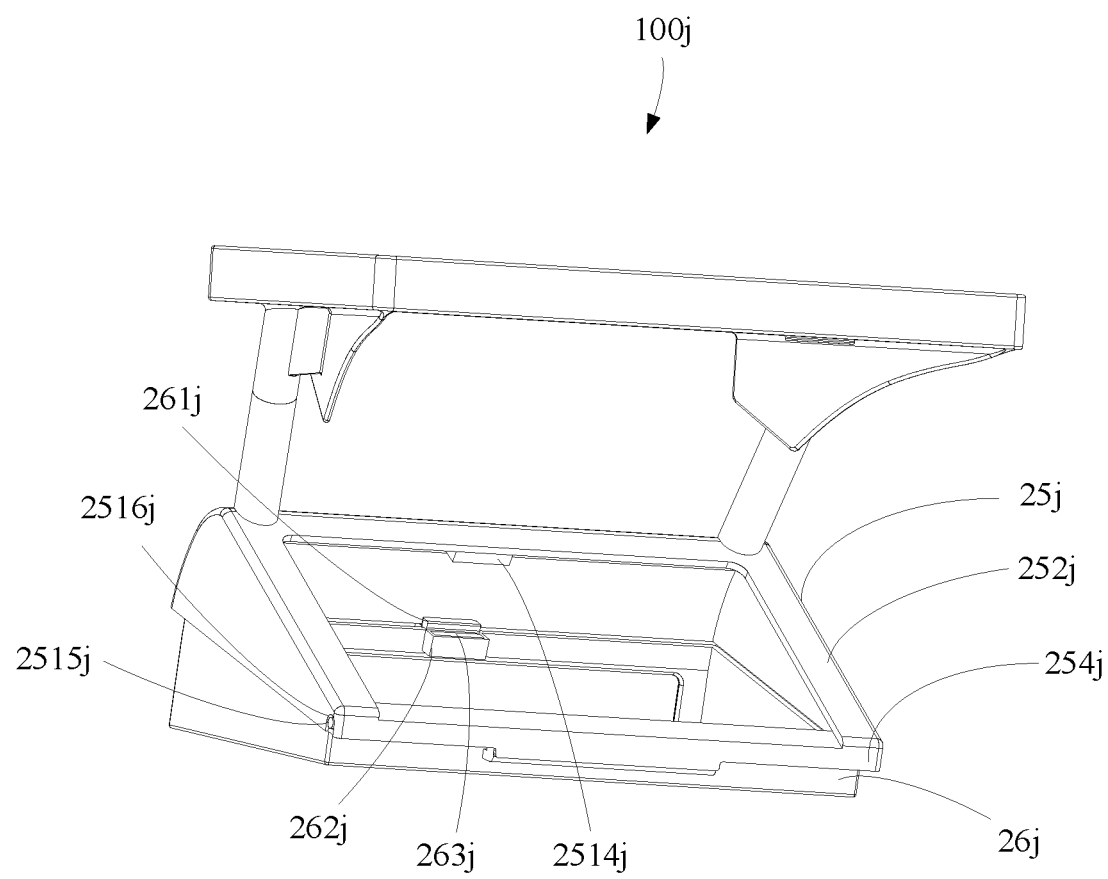
FIG. 13 is a structure diagram of a shelf according to a tenth embodiment of the present disclosure.
Figure 14:
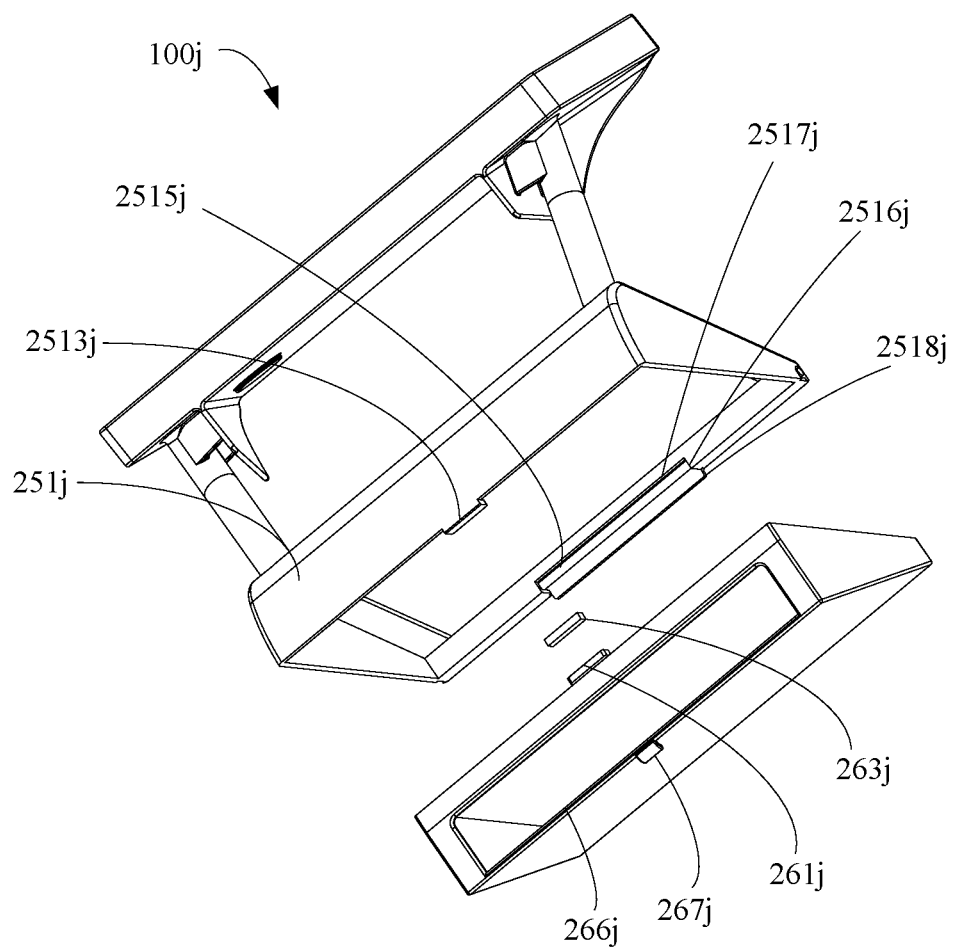
FIG. 14 is an exploded view of the shelf of FIG. 13.
Figure 15:
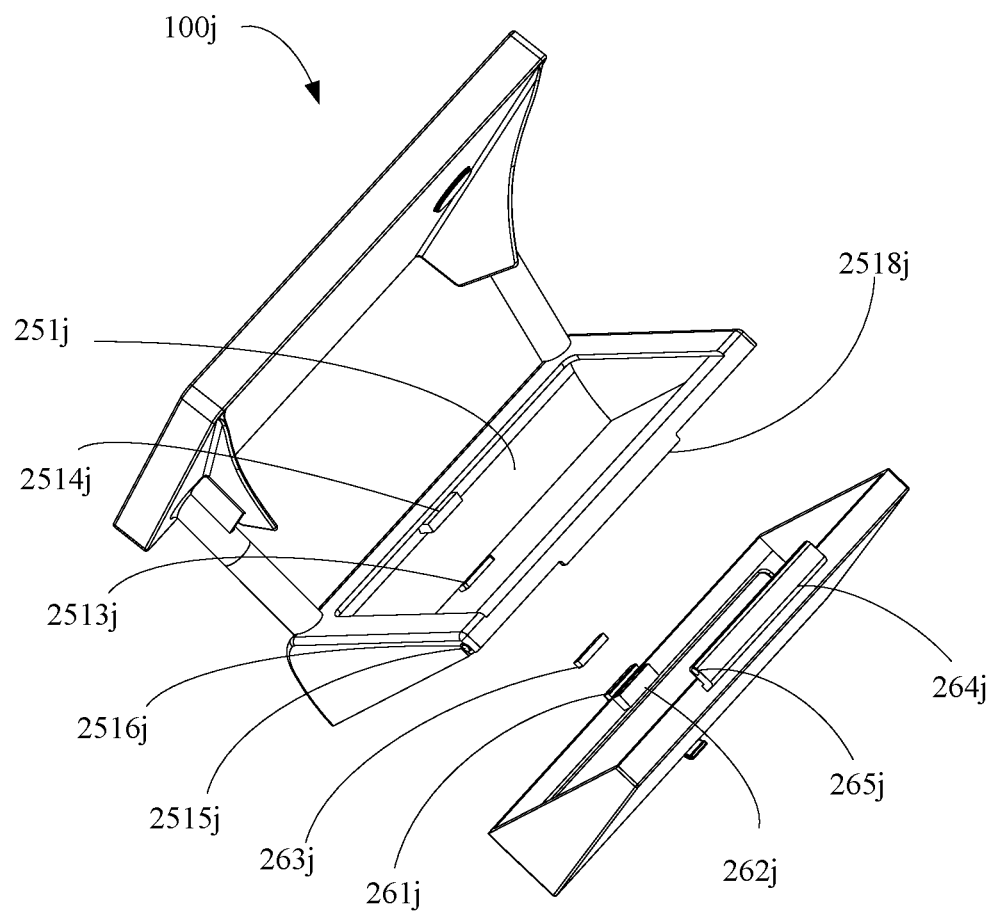
FIG. 15 is similar to FIG. 14, but shown from another view.

Please referring to FIGS. 13 to 15, the present disclosure provides a shelf 100*j* according to a tenth embodiment. The shelf 100*j* is similar to the shelf 100*h* in structure, the differences between the shelf 100*j* and the shelf 100*h* include: the shelf 100*j* further includes a second storage box 26*j* communicated with the first storage box 25*j*, one side of the second storage box 26*j* is rotatably connected with the first storage box 25*j*, and another side of the second storage box 26*j* is detachably connected with the first storage box 25*j*.

In at least one embodiment, the first storage box 25*j* does not include the second bottom wall 253*j*, so the first storage box 25*j* can be communicated with the second storage box 26*j*.

In at least one embodiment, the second side wall 251*j* does not define the first opening 2511*j*.

In at least one embodiment, the first storage box 25*j* includes a blocking member 2513*j* arranged on a lower end of the second side wall 251*j*, and a sixth magnetic member 2514*j* arranged on an upper end of the second side wall 251*j*. The second storage box 26*j* includes a protrusion 261*j*, a first accommodating portion 262*j*, and a seventh magnetic member 263*j* received in the first accommodating portion 262*j*. When the second storage box 26*j* is in a closed state, the sixth magnetic member 2514*j* is absorbed with the seventh magnetic member 263*j*, and the second storage box 26*j* is at least partially received in the first storage box 25*j*. When the second storage box 26*j* is in an opened state, the protrusion 261*j* is limited by the blocking member 2513*j* to prevent the second storage box 26*j* from completely separating from the first storage box 25*j*.

In at least one embodiment, the second side wall 251*j* is arc-shaped to provide a space for a movement of the protrusion 261*j*.

In at least one embodiment, the first storage box 25*j* further includes a third receiving portion 2516*j* opposite to the blocking member 2513*j* and arranged on the fourth side wall 254*j* and/or the third side wall 252*j*, a shaft 2515*j* received in the third receiving portion 2516*j*, the third receiving portion 2516*j* defines a notch 2517*j*. The second storage box 26*j* includes a second accommodating portion 264*j* defining a through hole 265*j*, the second accommodating portion 264*j* is received in the notch 2517*j*, the shaft 2515*j* is received in the through hole 265*j* of the second accommodating portion 264*j*, the second accommodating portion 264*j* is rotatably connected with the shaft 2515*j*, so the second storage box 26*j* is rotatably connected with the first storage box 25*j*.

In at least one embodiment, the first storage box 25*j* further includes a limiting portion 2518*j* protruded from the third receiving portion 2516*j*, the limiting portion 2518*j* is extended from a wall of the notch 2517j. The limiting portion 2518j is configured to limit a rotating degree of the second storage box 26j.

In at least one embodiment, the fourth side wall 254j can be acted as the third receiving portion 2516j.

In at least one embodiment, the second storage box 26j defines a opening 266j, user can put objects in the second storage box 26j by the opening 266j.

In at least one embodiment, the second storage box 26j further includes a handle 267j.

Figure 16:
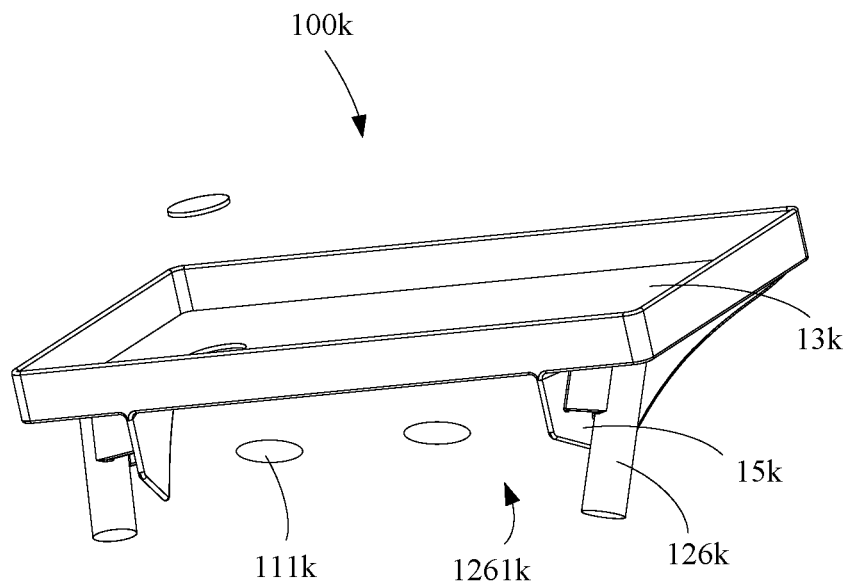
FIG. 16 is a structure diagram of a shelf according to an eleventh embodiment of the present disclosure.

Please referring to FIG. 16, the present disclosure provides a shelf 100k according to an eleventh embodiment. The shelf 100k is similar to the shelf 100a in structure, the differences between the shelf 100k and the shelf 100a include: the shelf 100k does not include the fixing assembly, the receiving assembly 10k of the shelf 100k can be mounted on the front panel 2011.

In at least one embodiment, the first bottom wall 13k of the receiving assembly 10k is connected with the front panel 2011 by at least connecting member 111k, the connecting member 111k can be a glue, a double sides adhesive tape, or the like.

In at least one embodiment, the receiving assembly 10k is mounted on the front panel 2011 and clamped between the front panel 2011 and the display panel 2012. In detail, the front panel 2011 is protruded with a blocking member 2014, the receiving assembly 10k can be clamped between the display panel 2012 and the blocking member 2014.

In at least one embodiment, the receiving assembly 10k further includes a clamping member 126k defining a clamping space 1261k. The receiving assembly 10k is mounted on the front panel 2011, and the connecting beam 2013 is clamped in the clamping space 1261k; or the receiving assembly 10k is mounted on the front panel 2011 and clamped between the front panel 2011 and the display panel 2012, and the connecting beam 2013 is clamped in the clamping space 1261k.

In detail, the receiving assembly 10k includes two opposite clamping columns (not labeled), the clamping columns and the first bottom wall 13k cooperatively define the clamping space 1261k.

Figure 17:
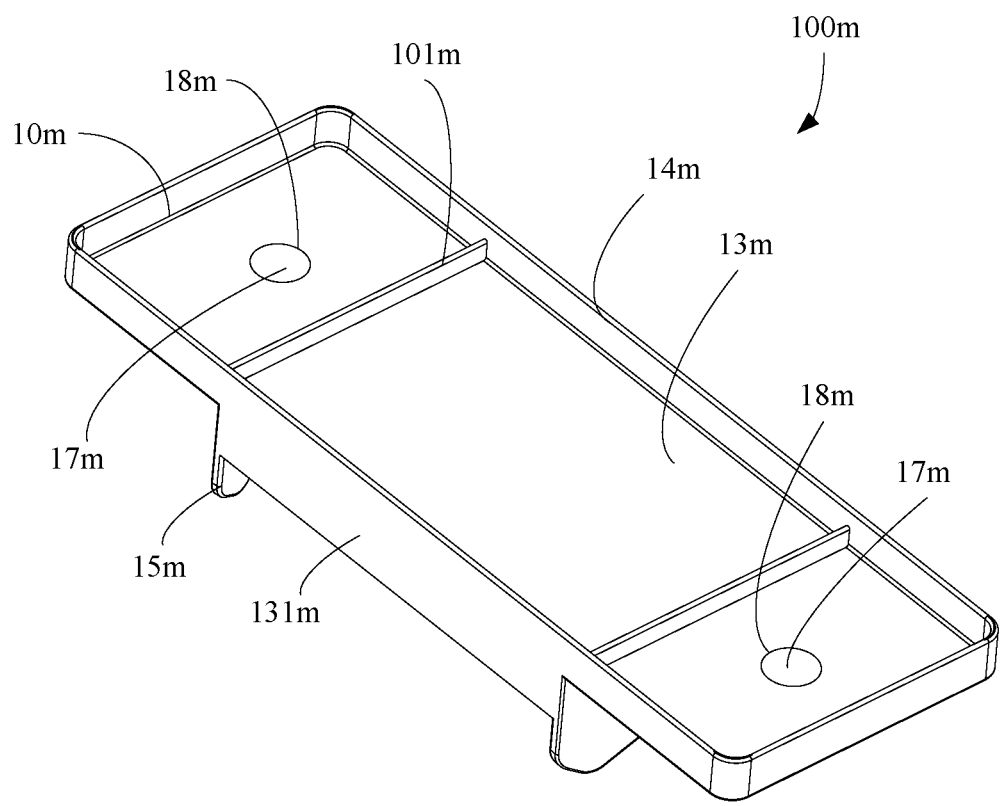
FIG. 17 is a structure diagram of a shelf according to a twelfth embodiment of the present disclosure.
Figure 18:
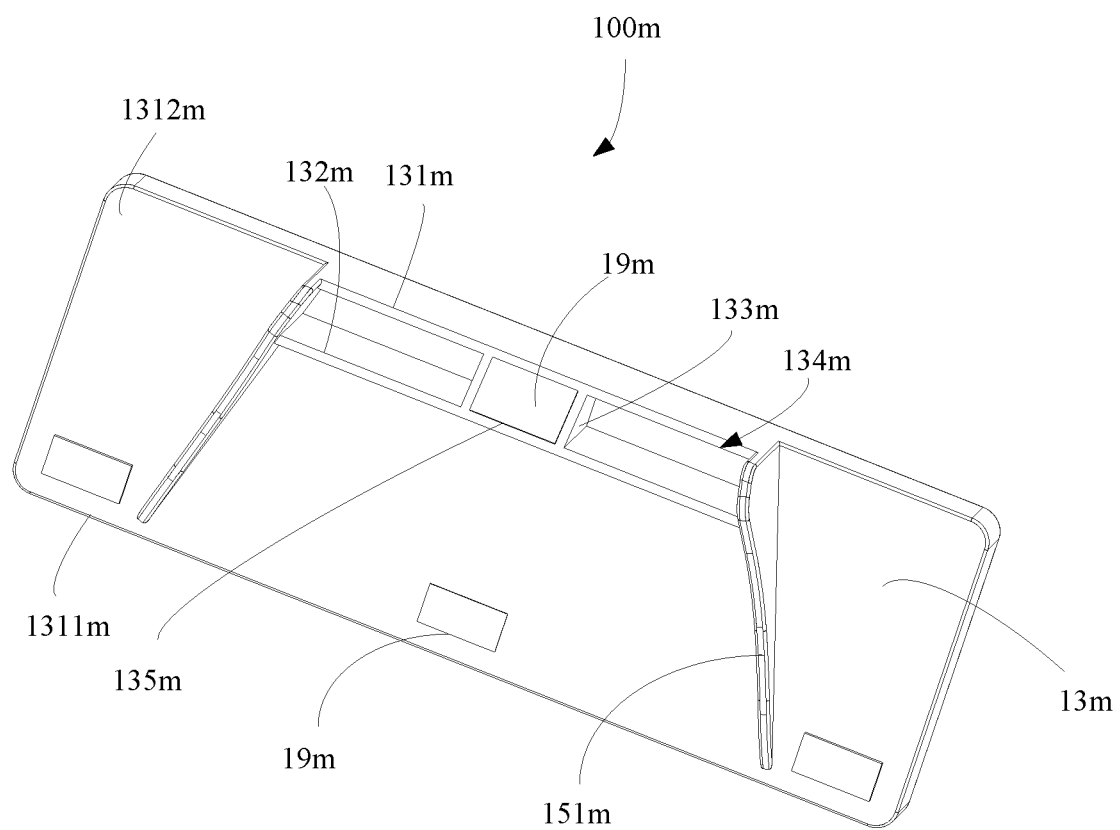
FIG. 18 is a structure diagram of the shelf of FIG. 17 shown from another angle.
Figure 19:
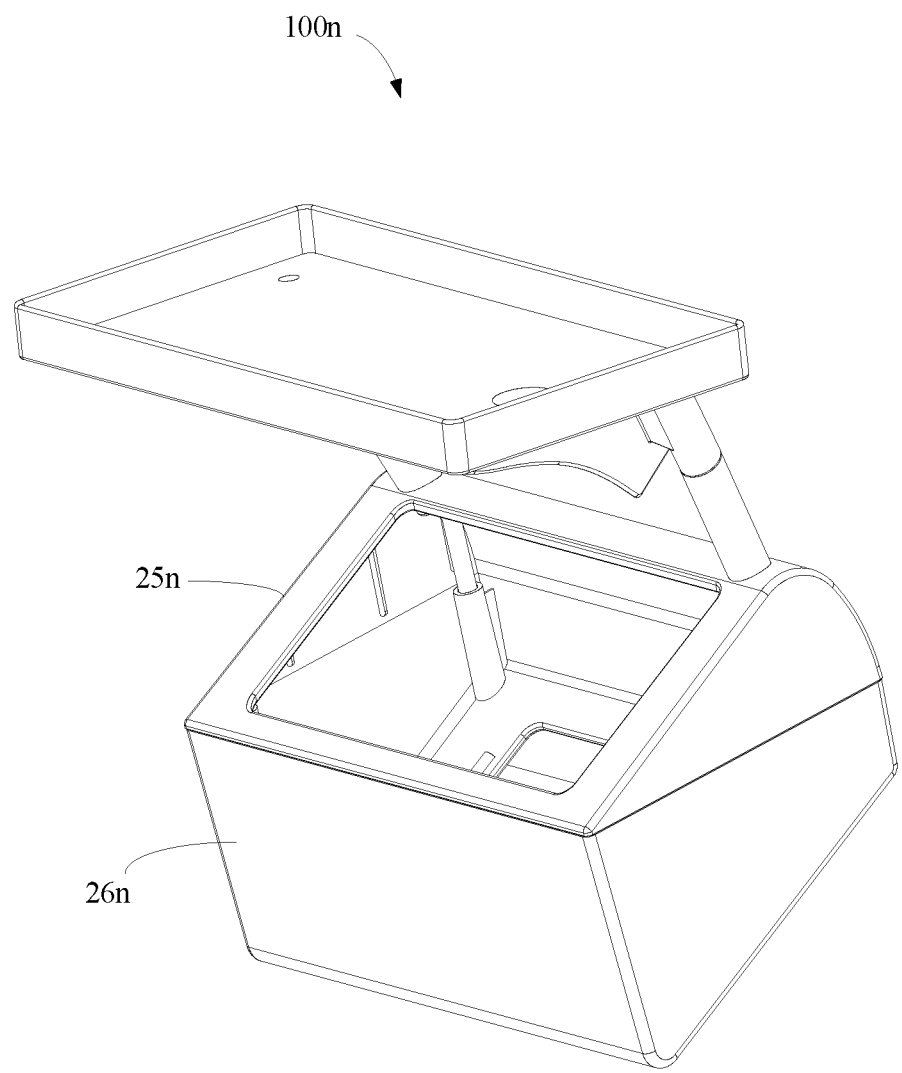
FIG. 19 is a structure diagram of a shelf according to a thirteenth embodiment of the present disclosure.
Figure 20:
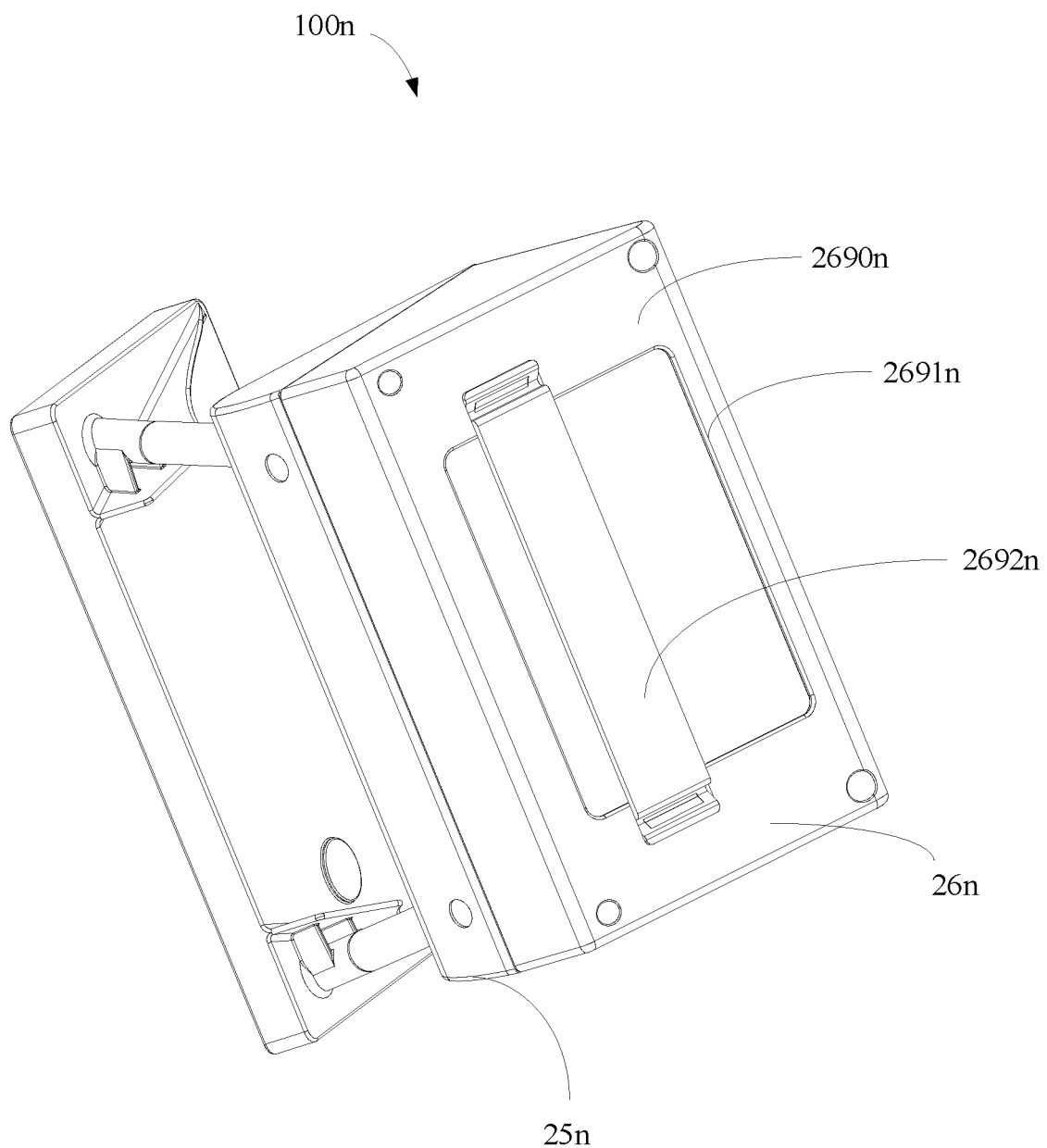
FIG. 20 is a structure diagram of the shelf of FIG. 19 shown from another angle.
Figure 21:
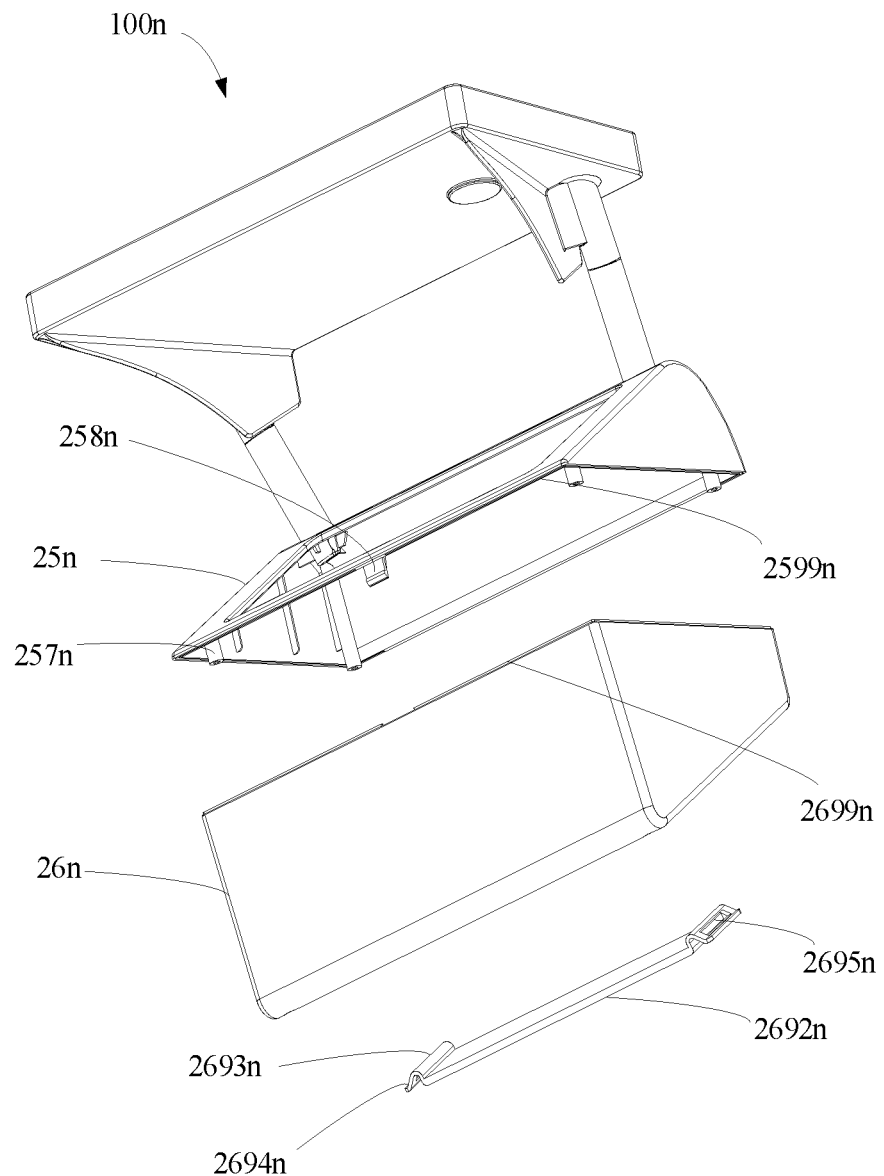
FIG. 21 is an exploded view of the shelf of FIG. 19.
Figure 22:
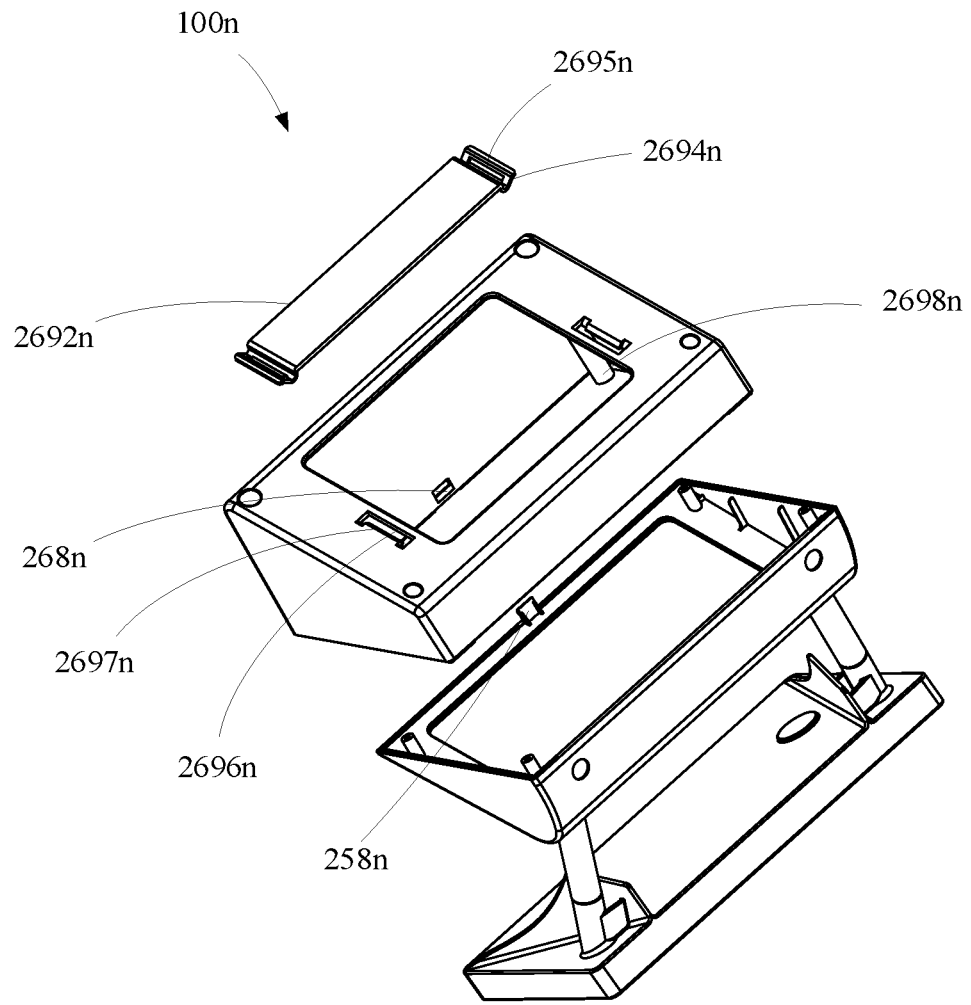
FIG. 22 is similar to FIG. 21, but shown from another view.

Please referring to FIGS. 17 and 18, the present disclosure provides a shelf 100m according to a twelfth embodiment. The shelf 100m is similar to the shelf 100k in structure, the differences between the shelf 100m and the shelf 100k include: the shelf 100m does not include the clamping member, the receiving assembly 10m of the shelf 100m can be mounted on the front panel 2011.

In at least one embodiment, the receiving assembly 10m is connected with the front panel 2011 by at least connecting member 19m, the connecting member 19m can be a glue, a double sides adhesive tape, or the like.

In at least one embodiment, a first side 1311m of the receiving assembly 10m is arranged with three connecting members 19m spaced apart from each other, and the connecting members 19m can connect the receiving assembly 10a with the front panel 2011.

In at least one embodiment, the three connecting members 19m are arranged on the first side 1311m of the bottom wall 13m.

In at least one embodiment, the receiving assembly 10m further includes a first connecting edge 131m, a side of the first connecting edge 131m is connected with the side wall 14m. Two ends of the first connecting edge 131m are respectively connected with the side wings 15m. The receiving assembly 10m further includes a second connecting edge 132m opposite to the first connecting edge 131m, two end of the second connecting edge 132m are also respectively connected with side wings 15m. A height of the second connecting edge 132m is greater than that of the first connecting edge 131m, so a mounting space 134m composed of the first connecting edge 131m, the second connecting edge 132m, and the side wings 15m is matched with the connecting beam 2013 in shape, the connecting beam 2013 can be mounted in the mounting space 134m.

In at least one embodiment, two third connecting edges 133m are arranged between the first connecting edge 131m and the second connecting edge 132m, and the third connecting edge 133m, the second connecting edge 132m, and the first connecting edge 131m cooperatively form a receiving groove 135m, one connecting member 19m is received in the receiving groove 135m, the connecting member 19m can attach with the connecting beam 2013, so the receiving assembly 10m can stably mounted on the connecting beam 2013.

In at least one embodiment, the first connecting edge 131m, the second connecting edge 132m, and the third connecting edges 133m are all arranged on a second side 1312m of the first bottom wall 13m.

In at least one embodiment, as the height of the second connecting edge 132m is greater than that of the first connecting edge 131m, free ends of the first connecting edge 131m and the second connecting edge 132m can match with the connecting beam 2013 in shape.

In at least one embodiment, the height of the third connecting edge 133m gradually increases along a direction from the second side 1312m to the first side 1311m. So that, free ends of the third connecting edges 133m can match with the connecting beam 2013 in shape.

In at least one embodiment, a depth of the receiving groove 135m also gradually increases along the direction from the second side 1312m to the first side 1311m, so the connecting member 19m is inclined, and the inclined connecting member 19m can match with the connecting beam 2013 in shape.

In at least one embodiment, the receiving assembly 10m is mounted on the front panel 2011 and clamped between the front panel 2011 and the display panel 2012. In detail, the receiving assembly 10k can be clamped between the display panel 2012 and the blocking member 2014 of the front panel 2011.

In at least one embodiment, the receiving assembly 10m is mounted on the front panel 2011 and clamped between the front panel 2011 and the display panel 2012, the connecting beam 2013 is mounted in the mounting space 134m.

In at least one embodiment, the first bottom wall 13m of the receiving assembly defines two third receiving grooves 18m, the two third receiving grooves 18m are defined in two opposite sides of the first bottom wall 13m. And two first magnetic member 17m are respectively received in the third receiving grooves 18m. The first magnetic member 17m can magnetically absorb with the ETC sensor, and the ETC card for increasing the vehicle passing rate is inserted in the ETC sensor.

Please referring to FIGS. 19 to 22, the present disclosure provides a shelf 100n according to a thirteenth embodiment. The shelf 100n is similar to the shelf 100h in structure, the differences between the shelf 100n and the shelf 100h include: the shelf 100n further includes a second storage box 26n connected with the first storage box 25n; the second storage box 26n includes a third bottom wall 2690n, the third bottom wall 2690n defines a fifth opening 2691n, the second storage box 26n further includes a supporting element 2692n, the supporting element 2692n is arranged on the third bottom wall 2690n and divides the fifth opening 2691n into two sub-openings (not labeled), a wet tissue box can be placed in the second storage box 26n and supported by the supporting element 2692n, and wet tissues can be taken out from the sub-openings.

In at least one embodiment, the first storage box 25n is substantially triangular shaped, the second storage box 26n is also substantially triangular shaped.

In at least one embodiment, the wet tissue box usually has a big lid, a size of at lease one of the two sub-openings is no less than a size of the lid, so that the lid can be opened or closed when the box for the wet tissue box is placed in the second storage box 26n.

In at least one embodiment, the first storage box 25n includes at least one connecting element 257n, the second storage box 26n includes at least one connecting element 2698n, the connecting element 257n is detachably connected with the connecting element 2698n, so that the first storage box 25n can be detachably connected with the second storage box 26n.

In at least one embodiment, the first storage box 25n includes a clamping element 258n, the second storage box 26n includes a notch 268n, the clamping element 258n is detachably clamped in the notch 268n, so that the first storage box 25n can be detachably connected with the second storage box 26n.

In at least one embodiment, at least one edge of the first storage box 25n includes a receiving groove 2599n, at least one edge of the second storage box 26n includes a protrusion 2699n, the protrusion 2699n is detachably received in the receiving groove 2599n, so that the first storage box 25n can be detachably connected with the second storage box 26n.

In at least one embodiment, the first storage box 25n does not include the second bottom wall, so the first storage box 25n can be communicated with the second storage box 26n.

In at least one embodiment, each end of the supporting element 2692n includes a connecting portion 2693n, the third bottom wall 2690n of the second storage box 26n defines two opposite receiving grooves 2696n, the connecting portion 2693n is detachably received in the receiving groove 2696n.

In at least one embodiment, the connecting portion 2693n is U-shaped, arc-shaped, or wave shaped.

In at least one embodiment, the connecting portion 2693n includes two opposite sides 2694n, an outer side 2694n defines a receiving groove 2695n. The third bottom wall 2690n defines two receiving groove 2696n, a protrusion 2697n is protruded from an inner wall of the receiving groove 2696n. When the connecting portion 2693n is received in the receiving groove 2696n, the protrusion 2697n is clamped in the receiving groove 2695n. In detail, the sides 2694n are received in the receiving groove 2696n.

In at least one embodiment, the receiving grooves 2696n are defined at two sides of the fifth opening 2691n.

In at least one embodiment, the side 2694n is arc-shaped, or straight-shaped.

In at least one embodiment, an inner wall of the receiving groove 2696n away from the fifth opening 2691n is protruded with the protrusion 2697n.

Figure 23:
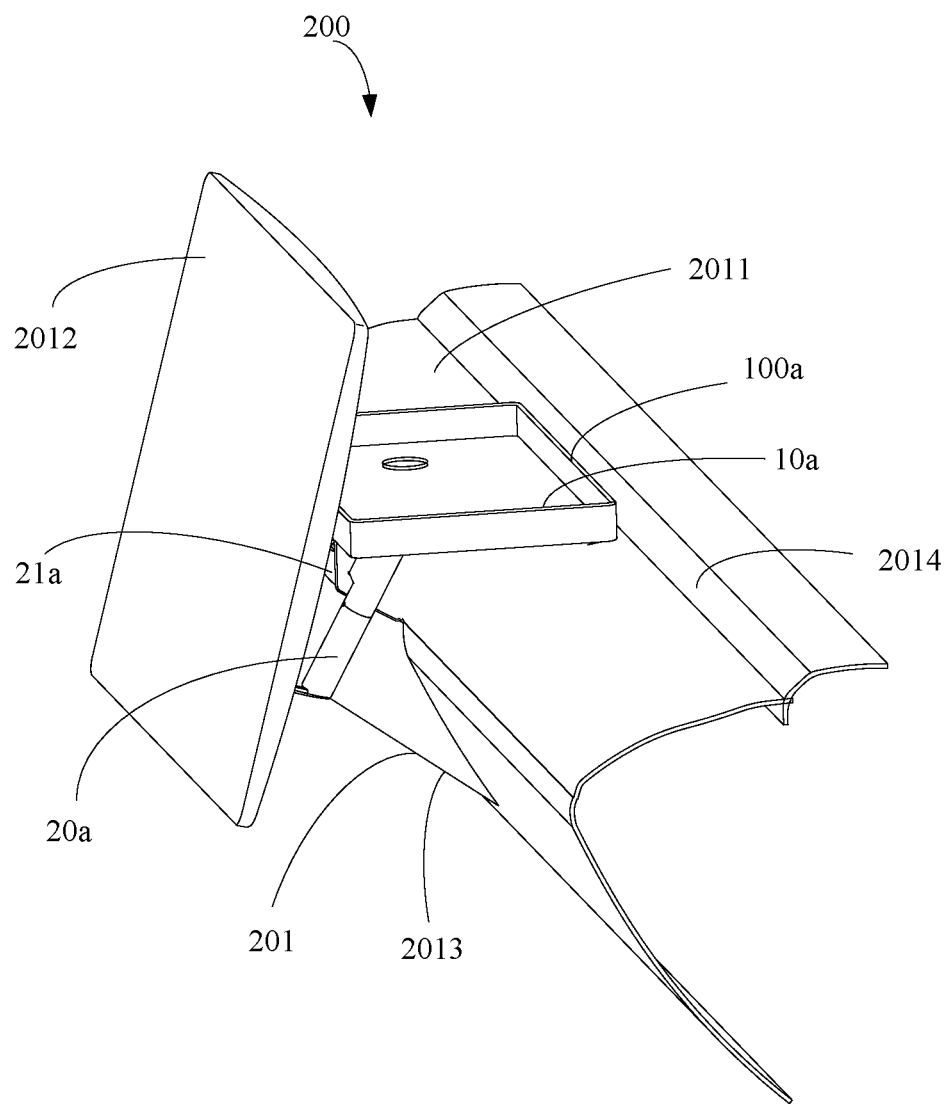
FIG. 23 is a structure diagram of a part of a vehicle according to an embodiment of the present disclosure, wherein, the shelf is mounted on a mounting portion.

Referring to FIG. 23, the present disclosure further provides a vehicle 200, such as a Tesla. The vehicle 200 includes a mounting portion 201 and the shelf. In the embodiment, the shelf 100a is used as an example to illustrate how the shelf 100a is mounted on the mounting portion 201.

As the vehicle 200 adopts the technical proposals of the above exemplary embodiments, the vehicle 200 at least has the beneficial effects of the technical proposals of the above exemplary embodiments, no need to repeat again.

Figure 24:
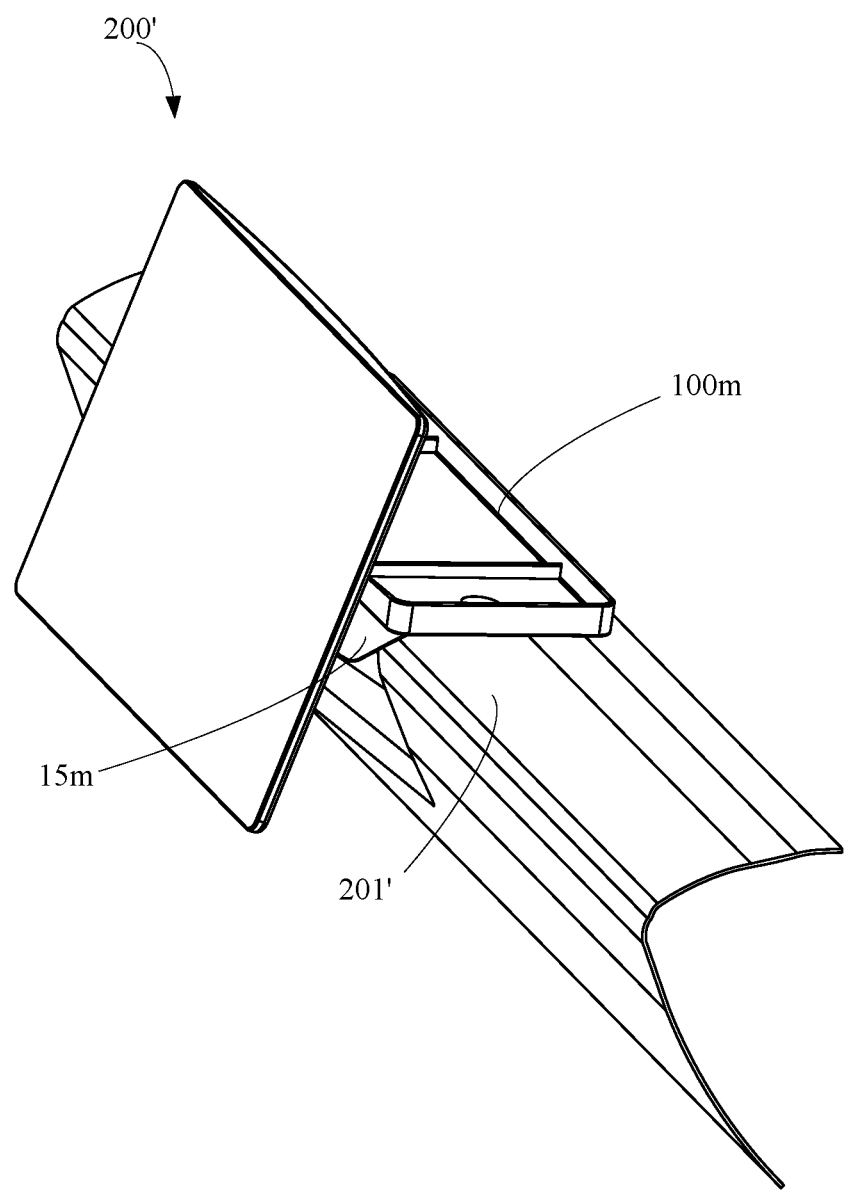
FIG. 24 is a structure diagram of a part of a vehicle according to another embodiment of the present disclosure, wherein, the shelf is mounted on a mounting portion.

Referring to FIG. 24, the present disclosure further provides a vehicle 200', such as a Tesla. The vehicle 200' includes a mounting portion 201' and the shelf. In the embodiment, the shelf 100m is used as an example to illustrate how the shelf 100m is mounted on the mounting portion 201'.

As the vehicle 200' adopts the technical proposals of the above exemplary embodiments, the vehicle 200' at least has the beneficial effects of the technical proposals of the above exemplary embodiments, no need to repeat again.

The above description is merely some embodiments. It should be noted that for one with ordinary skills in the art, improvements can be made without departing from the concept of the present disclosure, but these improvements shall fall into the protection scope of the present disclosure.

What is claimed is:

1. A vehicle organizer, mounted in a vehicle, the vehicle comprises a front panel, a display panel, and a connecting beam, opposite ends of the connecting beam are connected to the front panel and the display panel, respectively, wherein the vehicle organizer comprises:
   a receiving assembly, defining a storage space to store objects; and
   a fixing assembly, wherein the fixing assembly is detachably connected with the receiving assembly to form a connected structure surrounding the connecting beam, in a mounting state, the connecting beam passes through the connected structure, the connected structure is abutted against the connecting beam, such that the receiving assembly is detachably mounted in the vehicle;
   wherein the receiving assembly comprises a first connecting member, the fixing assembly comprises a second connecting member detachably connected with the first connecting member;
   one of the first connecting member and the second connecting member defines a recess, the other one of the first connecting member and the second connecting member is arranged with a clamping member protruding therefrom, a free end of the clamping member is protruded with a barb, the barb is abutted against an inner wall of the recess to be snapped into the recess, when mounting the vehicle organizer to the vehicle.

2. The vehicle organizer according to claim 1, wherein the fixing assembly is detachably connected with the receiving assembly by a snap structure.

3. The vehicle organizer according to claim 1, wherein one of the fixing assembly and the receiving assembly defines two recesses on opposite ends thereof, the other one of the fixing assembly and the receiving assembly comprises two first protrusions on opposite ends thereof, each of the two first protrusions is detachably engaged in the correspondingly recess, when in the mounting state.

4. The vehicle organizer according to claim 1, wherein the receiving assembly further comprises another first connecting member, the first connecting member and the another first connecting member are disposed on opposite ends of the receiving assembly; and the fixing assembly further comprises another second connecting member, the second connecting member and the another second connecting member are disposed on opposite ends of the fixing assembly, the another first connecting member is detachably connected with the another second connecting member.

5. The vehicle organizer according to claim 1, wherein the other one of the first connecting member and the second connecting member is further arranged with another clamping member opposite to the clamping member, the clamping member and the another clamping member deform to each other to snap into the corresponding recess, when mounting the vehicle organizer to the vehicle.

6. The vehicle organizer according to claim 1, wherein the fixing assembly further comprises a retaining member, the retaining member is substantially in a shape of a sheet, and the retaining member is retained against the connecting beam, when in the mounting state.

7. A vehicle organizer, mounted in a vehicle, the vehicle comprises a front panel, a display panel, and a connecting beam, opposite ends of the connecting beam are connected to the front panel and the display panel, respectively, wherein the vehicle organizer comprises:
- a receiving assembly, defining a storage space for store objects; and
- a fixing assembly, wherein the fixing assembly is detachably connected with the receiving assembly, in a mounting state, the fixing assembly is abutted against the connecting beam, such that the receiving assembly is detachably mounted in the vehicle;

wherein the receiving assembly comprises a first connecting member, the fixing assembly comprises a second connecting member detachably connected with the first connecting member;

one of the first connecting member and the second connecting member defines a recess, the other one of the first connecting member and the second connecting member is arranged with a clamping member protruding therefrom, a free end of the clamping member is protruded with a barb, the barb is abutted against an inner wall of the recess to be snapped into the recess, when mounting the vehicle organizer to the vehicle.

8. The vehicle organizer according to claim 4, wherein the receiving member comprises:
- a first bottom wall, connected with the first connecting portions; and
- at least one first side wall, connected with the first bottom wall;
- the first bottom wall and the first side wall cooperatively define the storage space, the first bottom wall, the first connecting members, and the fixing assembly cooperatively define the connected structure.

* * * * *